(No Model.) 3 Sheets—Sheet 1.
W. BRADFORD.
SEED PLANTER AND FERTILIZER DISTRIBUTER.
No. 276,759. Patented May 1, 1883.
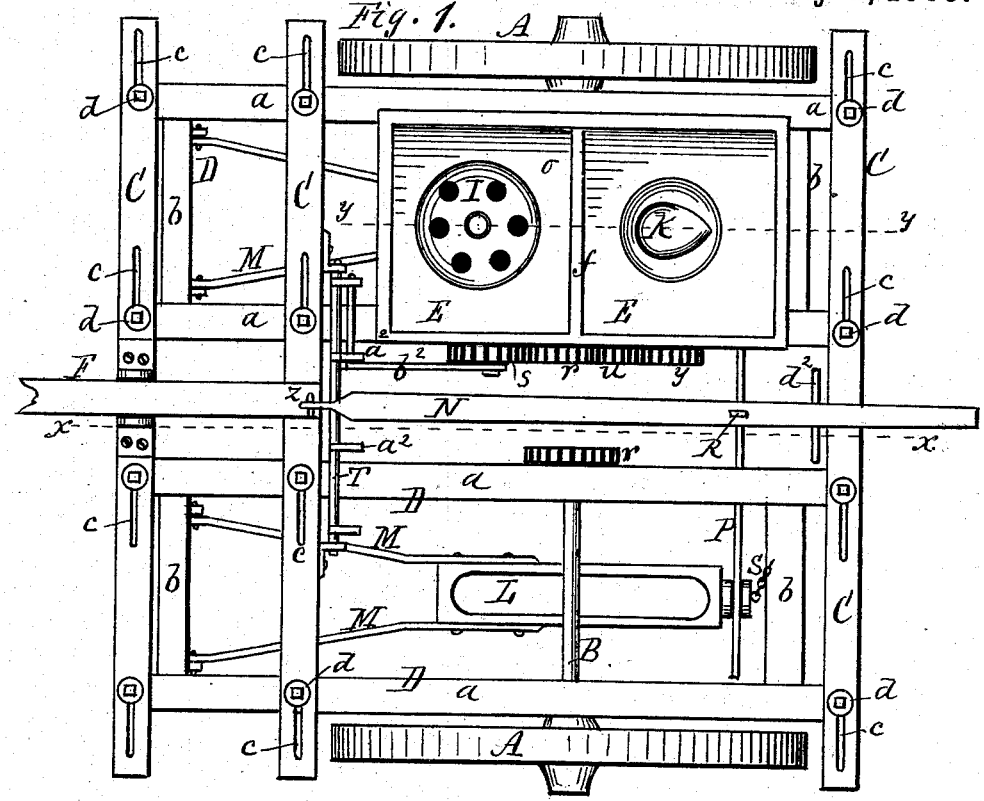
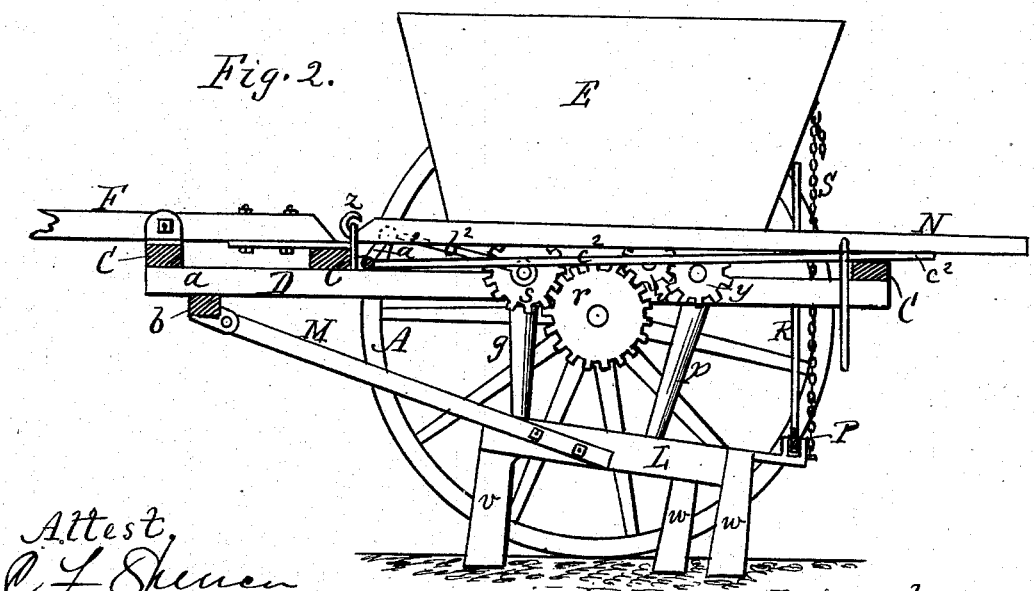
Attest:
C. F. Spencer
P. H. Costick
Inventor:
Wm. Bradford,
per R. F. Osgood,
atty.

(No Model.) 3 Sheets—Sheet 2.
W. BRADFORD.
SEED PLANTER AND FERTILIZER DISTRIBUTER.
No. 276,759. Patented May 1, 1883.
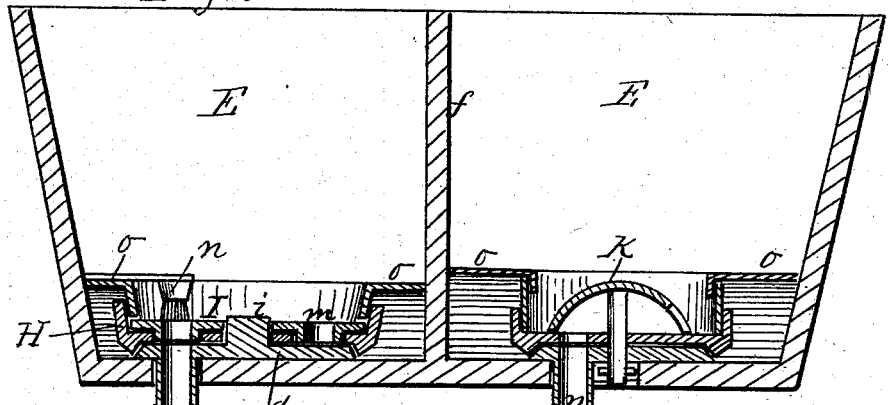
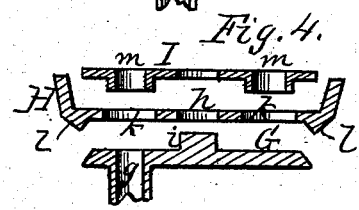
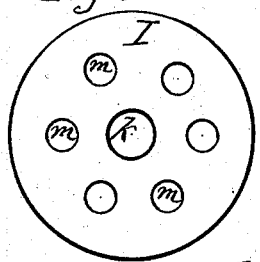
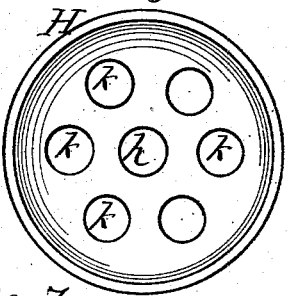
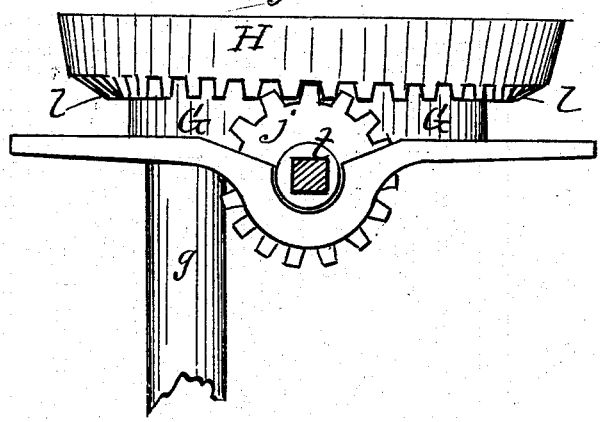
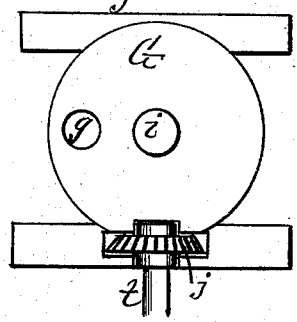
Attest.
O. F. Spencer
P. H. Costie
Inventor.
Wm. Bradford,
per R. F. Osgood,
atty
N. PETERS, Photo-Lithographer, Washington, D. C.

(No Model.) 3 Sheets—Sheet 3.
W. BRADFORD.
SEED PLANTER AND FERTILIZER DISTRIBUTER.
No. 276,759. Patented May 1, 1883.
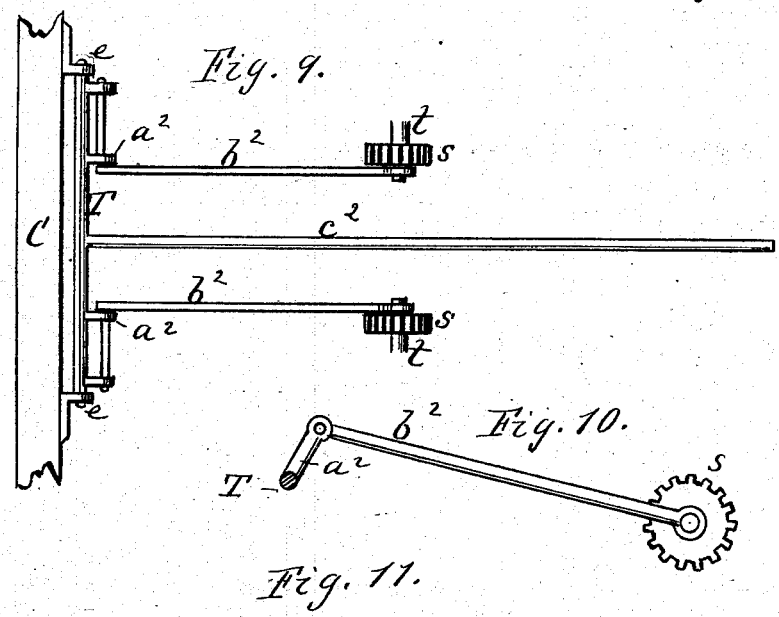
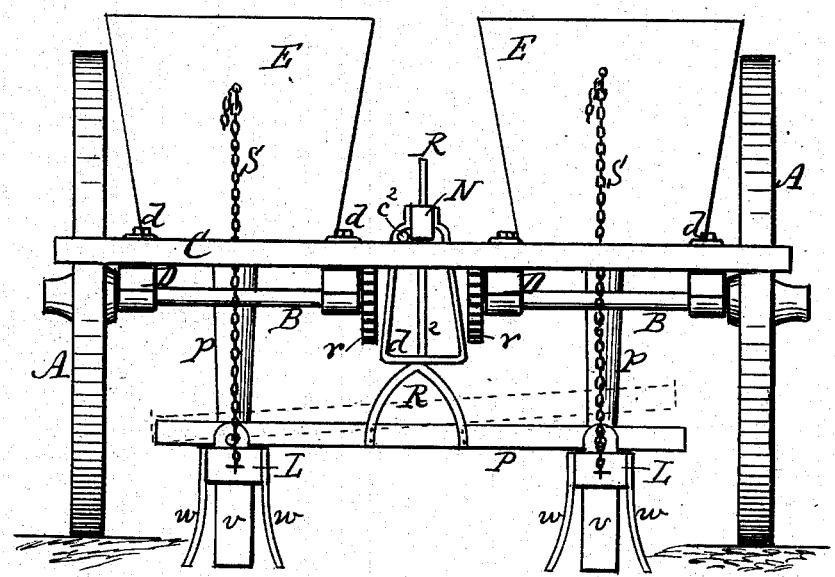
Attest.
C. L. Spencer
P. H. Costie
Inventor.
Wm. Bradford,
per R. F. Osgood,
atty.

UNITED STATES PATENT OFFICE.

WILLIAM BRADFORD, OF BROCKPORT, NEW YORK.

SEED-PLANTER AND FERTILIZER-DISTRIBUTER.

SPECIFICATION forming part of Letters Patent No. 276,759, dated May 1, 1883.

Application filed December 4, 1882. (No model.)

*To all whom it may concern:*

Be it known that I, WILLIAM BRADFORD, of Brockport, Monroe county, New York, have invented a certain new and useful Improvement in Seed-Planters and Fertilizer-Distributers; and I do hereby declare that the following is a full, clear, and exact description of the same, reference being had to the accompanying drawings, in which—

Figure 1 is a plan of the machine with the hopper on one side removed from place for the purpose of showing the drill-tooth and its attachments. Fig. 2 is a longitudinal vertical section in line $x\,x$ of Fig. 1. Fig. 3 is a vertical section in $y\,y$ through one of the hoppers, showing it on an enlarged scale. Fig. 4 is a vertical section of the plates of the seeding apparatus separated from each other. Figs. 5, 6, and 7 are plan views of the same parts. Fig. 8 is an enlarged side elevation of the seeding apparatus. Fig. 9 is a plan of the devices for disengaging the gears of the seeding apparatus. Fig. 10 is a side elevation of the same. Fig. 11 is a rear elevation of the machine.

My improvement relates to combined seed-planters and fertilizer-distibuters; and it consists in the construction and arrangement hereinafter more fully described and claimed.

In the drawings, A A indicate the two supporting and driving wheels of the machine attached to half-axles B B and supporting a frame upon which the parts are mounted. This frame is constructed as follows: C C C are three cross-bars, beneath which are attached two supplementary frames, D D, which carry the hoppers E E, the seeding and distributing apparatus connected therewith, and also the drill-teeth, coverers, and other attachments by which the machine is operated. Each of the supplementary frames consists of two longitudinal bars, $a\,a$, and cross-bars $b\,b$, connecting them and forming a rectangle, and adjustable out and in laterally, for the purpose of varying the width of the rows. This adjustment is attained by making slots $c\,c$ in the cross-bars C C C and passing bolts $d\,d$ through the same, which clamp the frames D D to the cross-bars. By loosening the bolts the supplementary frames and their attachments can be moved out and in on the cross-bars to the extent of the length of the slots.

F is a tongue or pole by which the machine is drawn.

The hoppers E are each divided into two compartments by means of a vertical partition, $f$, Fig. 3, the front compartment containing the seed and the rear compartment containing the fertilizing material.

The devices for dropping the seed are constructed as follows:

G is a fixed bed-plate attached on the bottom of the hopper and provided with a spout, $g$, for dropping the seed.

H is a dish-shaped plate, having a hole, $h$, in its center, which fits over a stud, $i$, of the bed-plate G and allows plate H a free revolving movement thereon. This plate has also a series of holes, $k\,k$, and on its outside, at the bottom, it has a bevel-gear, $l$, with which engages a bevel-pinion, $j$, by which it receives motion.

I is a flat plate, which I denominate the "seeding-plate," which has also a central hole that rests over the stud $i$, and a series of projecting hollow nipples, $m\,m$, which pass loosely through the holes $k\,k$ of plate H. The two plates H I, as they revolve together, discharge the seed, which fills the holes $k\,k$, into the spout $g$ as they come round to it in succession. The seed is leveled off in the holes $k\,k$ by a brush, $n$, and the seed is directed down to the holes by a directing-plate, $o$, in the bottom of the hopper.

The apparatus in the rear compartment for distributing the fertilizing material may be of any suitable kind, that shown in the drawings being a plate similar to the plate H, and an inverted hollow egg-shaped cup, K, resting stationary therein, the material being forced under the cup through an opening therein as the plate revolves, and thence discharged downward through the spout $p$.

$r$ is a spur-gear on the inner end of each half-axle B.

$s$ is a spur-pinion engaging with $r$ and attached to the shaft $t$ of the bevel-pinion $j$. By this means the rotary motion is imparted to the seeding apparatus.

$u$ is a pinion engaging with $r$, and $y$ is a spur-gear engaging with $u$ and attached to a shaft having a beveled pinion, which drives the distributing apparatus for the fertilizer, in the same manner that the seeding apparatus is driven.

L is a yoke or frame hung by straps M M to the front end of the frame D on each side of the machine, and to which, at the front, is attached the opening drill-tooth $v$, and to the rear are attached the covering-wings $w$ $w$. The top of the yoke is open, and the discharge-spouts $g$ $p$ open therein, so as to drop both the seed and the fertilizing material in the rear of the drill-tooth and in front of the coverers. The straps M are pivoted in front, so that the drill-tooth and coverers can rise and fall.

N is a lever located in the center of the machine, extending longitudinally and attached at its front end to the frame by a hook, $z$, so that it can be turned up and down or sidewise at the rear end.

P is a cross-bar at the rear, connecting the two yokes L L, as shown in Fig. 11.

R is a standard, stiff with the cross-bar P, and attached to the lever N. By raising the rear end of the lever bodily it will be seen that both yokes and their teeth will be raised from the ground, and by raising said lever and throwing it either to the right or left one only of said yokes will be raised from the ground, leaving the other in place, as indicated by the dotted lines, Fig. 11. By this means, in planting two rows the operator can gage the machine to a side-hill or incline and plant equal depths on both sides; or he can raise one side to pass an obstruction without raising the other side.

S S are chains attached to the rear ends of the yokes and attached at their tops to hooks on the hoppers or the main frame, by which the depths of cut may be regulated as desired.

T is a rock-shaft resting in bearings $e$ $e$ at the front end of the frame and provided with crank-arms $a^2$ $a^2$. To these crank-arms are pivoted connecting-rods $b^2$ $b^2$, which extend backward and are pivoted at the opposite end to the shafts of the two spur-pinions $s$ $s$.

$c^2$ is a long arm, stiff with rock-shaft T, and extending back under or alongside with the lever N to the rear end of the frame.

$d^2$ is a loop or hanger attached to lever N, and embracing or inclosing the end of shaft $c^2$. When the lever N is raised at such height as to lift the drill-teeth high from the ground, as is necessary in going into the field or in turning corners, the loop $d^2$ will also lift the arm $c^2$, thereby throwing the crank-arms $a^2$ $a^2$, drawing forward the rods $b^2$ $b^2$, and disengaging the pinions $s$ $s$ from the spur-gears $r$ $r$, thereby stopping the seeding apparatus. To enable this to be done the shafts $t$ $t$ must have a small sliding movement allowed them in their boxes or bearings on the side next to the gearing. By removing the plate I and substituting another having a greater or less number of holes, $m$, the distance of the hills apart can be varied as desired. The holes must, however, be spaced to enter some of the holes $k$ in the plate H.

Having described my invention, what I claim as new, and desire to secure by Letters Patent, is—

1. In a seed-planter and fertilizer-distributer, the combination of the bed-plate G, the rotary dish-shaped plate H, and the seeding-plate I, the plate I having a series of projecting open-ended nipples, $m$ $m$, which rest in holes $k$ $k$ of plate H, and these two plates adapted to rotate together around a central stud of the fixed plate G, as shown and described, and for the purpose specified.

2. In a seed-planter and fertilizer-distributer, the combination of the yokes L L, carrying the teeth $v$ $w$, the cross-bar P, connecting the two yokes, the stiff standard R, attached to the cross-bar, the chains S S, connecting the yokes with the hoppers or main frame, and the lever N, to which the standard is attached at the top, said lever being jointed at the front end to the main frame by a hook, so that it can be moved to one side as it is raised at the rear for the purpose of raising one only of the yokes, as shown and described, and for the purpose specified.

3. In a seed-planter and fertilizer-distributer, the combination of the lever N, provided with the loop $d^2$, the rock-shaft T, provided with the long arm $c^2$, extending back and resting in the loop of the lever, and the connecting-rods $b^2$ $b^2$, attached at one end to crank-arms of the rock-shaft and at the other end to the shafts of the pinions $s$ $s$, whereby when the lever is raised said pinions will be thrown out of gear with the gears of the seeding apparatus, as herein shown and described.

4. In a seed-planter and fertilizer-distributer, the combination of the yokes L L, the cross-bar P, the standard R, the lever N, provided with the loop $d^2$, the rock-shaft T, provided with a long arm, $c^2$, extending back through the loop of the lever, and the rods $b^2$ $b^2$, connecting crank-arms of the rock-shaft with pinions which engage with the gears of the seeding apparatus, as herein shown and described.

In witness whereof I have hereunto signed my name in the presence of two subscribing witnesses.

WM. BRADFORD.

Witnesses:
R. F. OSGOOD,
JACOB SPAHN.